US012809113B2

(12) United States Patent
Solomon et al.

(10) Patent No.: US 12,809,113 B2
(45) **Date of Patent: *Nov. 24, 2026**

(54) TELESCOPIC IMAGE CAPTURE/RECORDING DEVICE

(71) Applicant: Designs for Vision, Inc., Bohemia, NY (US)

(72) Inventors: Moty Solomon, Beit uziel (IL); Richard E. Feinbloom, New York, NY (US)

(73) Assignee: Designs for Vision, Inc., Bohemia, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 18/667,853

(22) Filed: May 17, 2024

(65) Prior Publication Data

US 2024/0302622 A1 Sep. 12, 2024

Related U.S. Application Data

(63) Continuation-in-part of application No. 18/102,747, filed on Jan. 29, 2023, now Pat. No. 12,038,630.

(Continued)

(51) Int. Cl.
*G02B 7/02* (2021.01)
*G02B 3/00* (2006.01)

(Continued)

(52) U.S. Cl.
CPC ........... *G02B 7/021* (2013.01); *G02B 3/0056* (2013.01); *G02B 7/09* (2013.01); *H04N 23/55* (2023.01); *H04N 23/661* (2023.01)

(58) Field of Classification Search
CPC .. G02B 21/18–22; G02B 23/04; G02B 23/08; G02B 23/10; G02B 23/105;

(Continued)

(56) References Cited

U.S. PATENT DOCUMENTS

| | | |
|---|---|---|
| 2,246,817 A | 6/1941 | Sauer |
| 2,986,969 A | 6/1961 | Muncheryan |

(Continued)

FOREIGN PATENT DOCUMENTS

| | | | |
|---|---|---|---|
| JP | 2009098570 A * | 5/2009 | ........... A61B 90/361 |
| WO | WO 9215039 | 9/1992 | |
| WO | WO 2022/005404 | 1/2022 | |

OTHER PUBLICATIONS

English machine translation of JP-2009098570-A (Year: 2009).*

(Continued)

*Primary Examiner* — Nicholas R. Pasko
(74) *Attorney, Agent, or Firm* — Law Office of Carl Giordano, PC

(57) ABSTRACT

A telescopic/image capture device that allows for the concurrent viewing and capturing an image of an object, wherein the captured image is magnified to the same level than that of the viewed image. Further included are filters incorporated into the device to allow for the attenuation of light in undesired wavelengths while allowing light in desired wavelengths to pass unattenuated. In still a further aspect of the invention, a second telescopic lens is incorporated into the path of light to be captured by the image capture device, wherein the image captured and recorded is of a greater magnification than that of the user viewable image.

16 Claims, 13 Drawing Sheets

Related U.S. Application Data

(60) Provisional application No. 63/634,386, filed on Apr. 15, 2024.

(51) Int. Cl.
*G02B 7/09* (2021.01)
*H04N 23/55* (2023.01)
*H04N 23/661* (2023.01)

(58) Field of Classification Search
CPC ...... G02B 23/12; G02B 23/125; G02B 23/14; G02B 25/001; G02B 25/004; G02B 25/007; G02B 25/008; G02B 25/02; G02B 27/106; G02B 27/108; G02B 27/14; G02B 27/141; G02B 27/142; G02B 27/143; G02B 27/144; G02B 27/149; G02B 27/126; G02B 27/16; G02B 27/283; G02B 13/16; G02C 7/086; G02C 7/10; G02C 9/04; A61B 1/00188; A61B 1/24; A61B 90/361; A61B 90/37; A61B 2090/3616; A61B 2090/372; A61B 2090/373
See application file for complete search history.

(56) References Cited

U.S. PATENT DOCUMENTS

| | | | | |
|---|---|---|---|---|
| 3,273,456 | A | 9/1966 | Feinbloom | |
| 3,519,339 | A | 7/1970 | Hutchinson | |
| 4,511,225 | A | 4/1985 | Lipson | |
| 4,544,250 | A | 10/1985 | Tanaka | |
| 5,018,846 | A | 5/1991 | Gutridge | |
| 5,042,930 | A | 8/1991 | Hutt | |
| 5,078,469 | A | 1/1992 | Clark | |
| 5,162,647 | A | 11/1992 | Field, Jr. | |
| 5,331,357 | A | 7/1994 | Cooley | |
| 5,668,611 | A | 9/1997 | Ernstoff | |
| 5,668,661 | A | 9/1997 | Tomioka | |
| 6,546,208 | B1 | 4/2003 | Costales | |
| 6,697,195 | B2 | 2/2004 | Weber | |
| 7,409,792 | B2 | 8/2008 | Narcy | |
| 7,690,806 | B2 | 4/2010 | Feinbloom | |
| 8,120,847 | B2 | 2/2012 | Chang | |
| 8,215,791 | B2 | 7/2012 | Feinbloom | |
| 8,922,624 | B2 | 12/2014 | Pretorius | |
| RE46,463 | E | 7/2017 | Feinbloom | |
| 9,791,138 | B1 | 10/2017 | Feinbloom | |
| 10,061,115 | B2 | 8/2018 | Feinbloom | |
| 10,132,483 | B1 | 11/2018 | Feinbloom | |
| 10,146,039 | B2 | 12/2018 | Schnitzker | |
| 10,215,977 | B1 | 2/2019 | Feinbloom | |
| 10,240,769 | B1 | 3/2019 | Braganca | |
| 10,247,384 | B1 | 4/2019 | Feinbloom | |
| 10,437,041 | B1 | 10/2019 | Feinbloom | |
| 10,698,196 | B2 | 6/2020 | Davidi | |
| 10,895,735 | B1 | 1/2021 | Feinbloom | |
| 12,038,630 | B1 * | 7/2024 | Feinbloom | G02B 21/18 |
| 12,332,507 | B2 * | 6/2025 | Feinbloom | A61B 1/00048 |
| 2001/0005281 | A1 | 6/2001 | Yu | |
| 2008/0219654 | A1 | 9/2008 | Border | |
| 2009/0040600 | A1 | 2/2009 | Vojtech | |
| 2009/0073558 | A1 | 3/2009 | Jacobs | |
| 2010/0053540 | A1 | 3/2010 | Blayden | |
| 2010/0210951 | A1 | 8/2010 | Rahman | |
| 2010/0305436 | A1 | 12/2010 | Chen | |
| 2011/0270035 | A1 | 11/2011 | Gono | |
| 2012/0120636 | A1 | 5/2012 | Wilt | |
| 2014/0036356 | A1 | 2/2014 | Feinbloom | |
| 2014/0210972 | A1 | 7/2014 | On | |
| 2015/0253589 | A1 | 9/2015 | Finkman | |
| 2024/0027744 | A1 | 1/2024 | Kondo | |
| 2024/0168275 | A1 * | 5/2024 | Feinbloom | G02B 21/361 |
| 2026/0016680 | A1 * | 1/2026 | Feinbloom | A61B 90/30 |

OTHER PUBLICATIONS

Notification of Transmittal of International Search Report and the Written Opinion of the International Searching Authority, issued Aug. 27, 2024.

PCT Recordation of Search History, issued Aug. 27, 2024.

* cited by examiner

TELESCOPIC IMAGE CAPTURE/RECORDING DEVICE

CLAIM OF PRIORITY

This applicant claims, pursuant to 35 USC 119, priority to and the benefit of the earlier filing date of provisional application Ser. No. 63/634,386, filed on Apr. 15, 2024 and pursuant to 35 USC 120, as a Continuation-in-part application, priority to, and the benefit of the earlier filing date of, patent application Ser. No. 18/102,747, filed on Jan. 29, 2023, the contents of which are incorporated, herein.

BACKGROUND OF THE INVENTION

Field of the Invention

This invention relates to the field of optical devices and, in particular, to an optical magnification device incorporating image capturing therein.

Background Information

Head-borne or wearable eyewear utilizing telescopic lens provide a practitioner with a magnified view of an area that the practitioner is viewing. Whether this is a patient's mouth, as in the case of a dentist, or in a body cavity, as in the case of a surgeon, the magnified view enables the practitioner to both see details that may not be viewable without the telescopic lens and provide more precise location of their instruments.

In addition, image capturing device (i.e., cameras) have allowed for the capturing and memorializing the images (photographic and/or video) viewed by a practitioner.

Smart microscopes, such as the Axiolab 5, by Carl Ziess, uses microscope cameras to capture magnified images of an area being viewed through the microscope.

However, such devices are large, stationary and expensive and, generally used by pathologists to analyze segments that may be taken outside of the arena the procedure is occurring. The smart microscope fails to provide for the real-time capturing of a magnified image during a procedure (e.g., open-heart surgery) that assists the practitioner in performing the procedure.

Hence, there is a need in the industry for the capturing of photographic and/or video images, in real-time, during dental or medical procedures that may be used to assist and memorialize the procedure being performed.

SUMMARY OF THE INVENTION

Disclosed is a user-wearable device comprising telescopic lens and image capturing devices that allows for the capturing of images with the same magnification level as that of the telescopic lens.

Disclosed is a magnification device comprising a magnification and filtering system that allows for the viewing and capturing of a same image within selected light wavelength ranges.

Disclosed is a magnification device incorporating an image capture device to allow the magnified viewing of an object and the concurrent capturing of a photo or video of the magnified object that is the same as that being viewed.

Disclosed is a magnification device for viewing a magnified image of an object and an image capture device for the concurrent capturing of a further magnified photo or video of the object.

Disclosed is an exemplary embodiment of user-wearable device comprising a magnification lens including a filtering system that allows for the viewing and capturing of images within a desired wavelength range.

Disclosed is a user-wearable device comprising telescopic lens and image capturing devices that allows for the capturing of images with different fields of view to present images with different or same magnification levels to a user.

Disclosed is a magnification device comprising a magnification and filtering system that allows for the viewing and capturing of a same image within selected light wavelength ranges with different fields of view.

Disclosed is a magnification device incorporating an image capture device to allow the magnified viewing of an object and the concurrent capturing of a photo or video of the magnified object, where the captured photo or videos may be digitally enhanced and superimposed to present a single image to a user.

Disclosed is a magnification device for viewing a magnified image of an object and an image capture device for the concurrent capturing of a further magnified photo or video of the object.

Disclosed is an exemplary embodiment of user-wearable device comprising a magnification lens including a filtering system that allows for the viewing and capturing of images within one of more desired wavelength ranges.

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented to clarify the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

The advantages, nature, and various additional features of the invention will appear more fully upon consideration of the illustrative embodiments described in detail in connection with the accompanying drawings, where like or similar reference numerals are used to identify like or similar elements throughout the drawings.

It is to be understood that the figures, which are not drawn to scale, and descriptions of the present invention described herein have been simplified to illustrate the elements that are relevant for a clear understanding of the present invention, while eliminating, for purposes of clarity, many other elements. However, because these omitted elements are well-known in the art, and because they do not facilitate a better understanding of the present invention, a discussion of such elements are not provided herein. The disclosure, herein, is directed also to variations and modifications known to those skilled in the art.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description, herein, should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instance, the terms "about" may include numbers that are rounded (or lowered) to the nearest significant figure.

Figure 1:
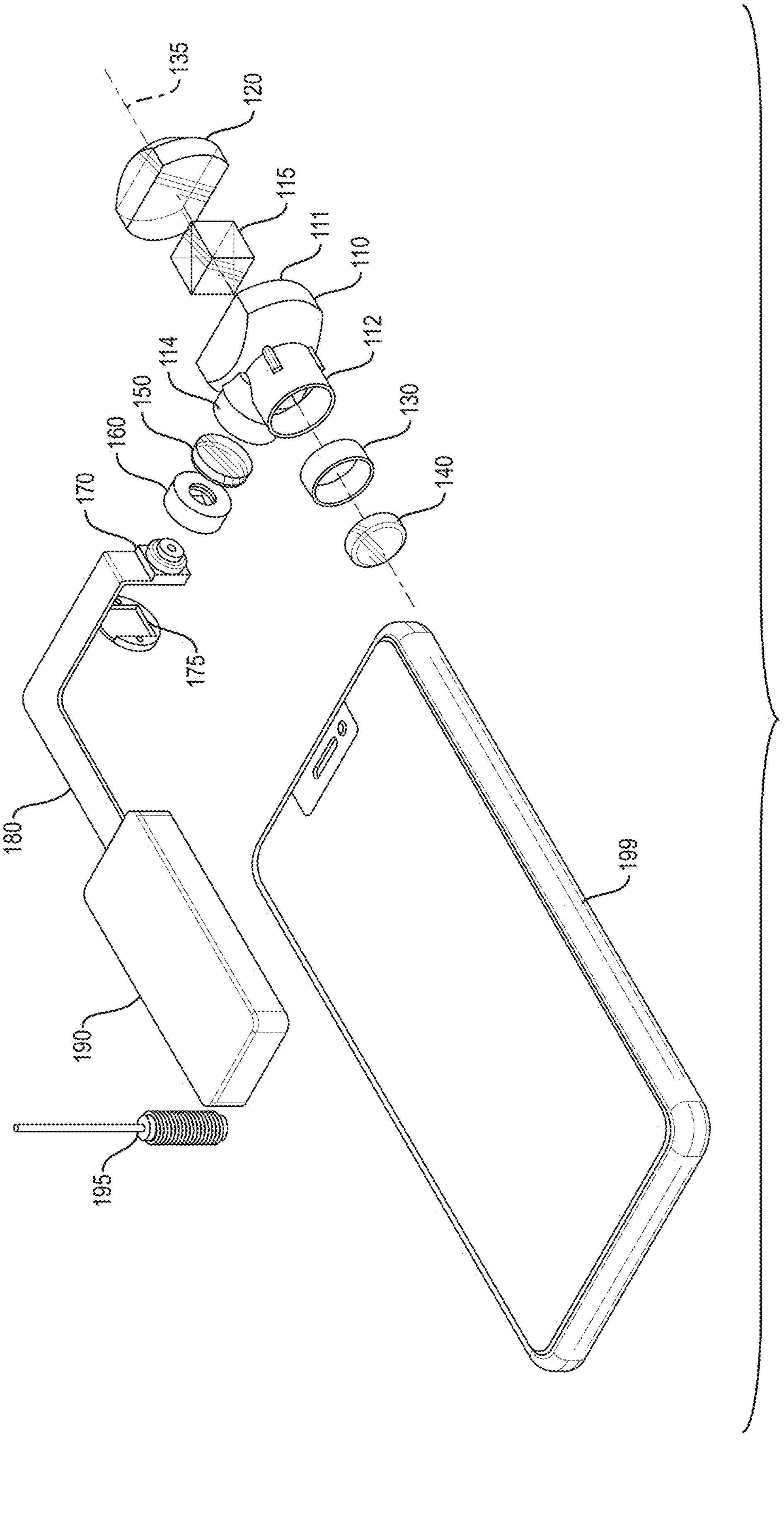
FIG. 1 illustrates an exploded perspective view of a first aspect of a first exemplary embodiment of a telescopic/image capturing device in accordance with the principles of the invention.

FIG. 1 illustrates an exploded perspective view of a first aspect of a first exemplary embodiment of telescopic/image capture device 100 in accordance with the principles of the invention.

Telescopic/image capture device 100 comprises housing 110 including a distal anterior end 111 into which may be place objective lens 120 and proximal posterior end 112 into which may be place eye-lens housing 130. Objective lens 120 and eye-lens 140 form a first magnification (or telescopic) system that allows for the enlarged viewing of an object (not shown) when the object is placed along the optical axis 135 formed by objective lens 120 and eye-lens 140 at a known distance (e.g., 12-20 inches) from the objective lens 120.

Further illustrated is second end 114, positioned substantially perpendicular to an optical axis 135 positioned between anterior end 111 and posterior end 112 of housing 110. Within second end 114 is positioned second eye-lens 150 and camera housing 160. Within camera housing 160 is further positioned an image capture module (e.g., camera, charged coupled device (CCD) and a complementary metal-oxide semiconductor sensor (CMOS), etc.) 170. Eye-lens 140 and second eye-lens 150 have substantially same optical properties (e.g., focal lens, curvature, etc.) such that the first magnification device formed by the combination of objective lens 120 and eye-lens 140 is the same as a second magnification device formed by the combination of objective lens 120 and eye-lens 150.

Although not discussed in detail, as it would be known in the art, that for the CCD or CMOS devices to view and capture images properly, a lens is required to focus light onto the elements of the CCD or CMOS sensors. In one aspect of the invention, the focusing lens may be separate from or integrated with the CCD or CMOS sensors. It would be recognized by those skilled in the art, the term "camera" refers to a device including a CCD or CMOS sensor with an integrated lens, wherein the integrated lens focuses light entering the lens onto the elements of the CCD or CMOS device. As such the term image capture device and camera are used interchangeable herein.

Camera opening 114 is closed by camera cap 175 such that objective lens 120, eye-lens 140 and camera cap 175 seal telescopic/image capture device 100 to prevent dust or damage to the elements of device 100. Further positioned within housing 110 is beam splitter or light director 115. Beam splitter or light director 115 is positioned within housing 110 to direct light (i.e., the image being viewed) entering objective lens 120 to both eye-lens 140 and second eye-lens 150. Accordingly, splitter 115 is arranged within housing 110 at a point to direct light toward second eye-lens 150.

In one aspect of the invention, beam splitter 115 may split the incoming light (for example, evenly, i.e., 50/50 split) between eye-lens 140 and second eye-lens 150 such that the light intensity viewed through eye-lens 140 is substantially the same as the light intensity viewed through second eye-lens 150. Alternatively, beam splitter 115 may split the incoming light in other ratios. For example, 60/40, 70/30, 80/20, 90/10, wherein the greater or larger amount of light is passed through beam splitter 115 toward eye-lens 140 and the remaining (lesser) amount being directed by beam splitter 115 toward second eye-lens 150. In one aspect of the invention, the greater sensitivity of the image capturing capability of camera module 170 allows for an unequal split of the light entering objective lens 120.

Although FIG. 1 illustrates splitter 115 as being a block-shaped element (i.e., block beam splitter) it would be recognized that splitter 115 may comprise a plate beam splitter or mirror assembly where the mirror is partially transmissive and partially reflective and oriented at a forty-five (45) degree angle. In one aspect of the invention, housing extension 114 is positioned, and sized, with respect to housing 110 to enable the distance between second eye-lens 150 and objective lens 120 to be substantially the same as the distance between objective lens 120 and eye-lens 140. Hence, the magnification of the image of the object being viewed through second eye-lens 150 is substantially the same as the magnification of the image of the object being viewed through eye-lens 140.

In accordance with the principles of the invention, the images captured by image capture device 170 are, thus, the same as those viewed by a user (not shown) through eye-lens 140.

Further illustrated is transmitter 190 in communication with image capture device 170, through a wire-ed connection 180. Transmitter 190, including antenna 195. is configured to transmit the captured images through second magnification device (i.e., objective lens 120 and second eye-lens 150) to a receiving/storage/display system 199; in this illustrated example, a cellular phone, however it would be understood that system 199 may be one of: a laptop computer, a stand-alone server system, a cloud-based server system, a display, a storage device and other similar systems used for storing and/or displaying images. The captured images/video may then be displayed, stored the captured image and/or be further processed to improve color, magnification, etc.

In addition, receiver 199 may further transmit the captured images to one or more devices using conventional cellular and/or local area network protocols (i.e., Wi-Fi, which utilizes one or more of the IEEE 802.11 family standard protocols).

Alternatively, transmitter 190 may transmit the captured images directly to other types of receiving systems such as a computing system, a network server, a cloud-based server, etc. that may display the captured images on a computer monitor or on a television screen. In one aspect of the invention, the transmission of the captured image, through transmitter 190, may be accomplished using one or more known wireless communication protocols. For example, near-field communication protocol (e.g., Zigbee), or BLUETOOTH, which allows a known separation between transmitter 190 and the intended receiver 199. Alternatively, transmitter 190 may transmit the captured images using Wi-Fi protocol that allows for a greater separation between transmitter 190 and the intended receiver 199. In still another embodiment, transmitter 190 may include a connector (e.g., HDMI, USB-c, etc.) that may attach to a wire-ed connector (not shown) that may transmit captured images/video to a receiving system (e.g., illustrated cellular phone 199, a computing system, etc.) through a wire-ed connection.

Although a wired connection 180 is shown as separating camera module 170 and transmitter 190, it would be recognized that transmitter 190 may be incorporated onto camera module 170 to transmit captured images to, for example, the illustrated receiving system 199.

Similarly, module 170 may be directly wired to one or more receiving devices that receive the captured images.

Figure 2:
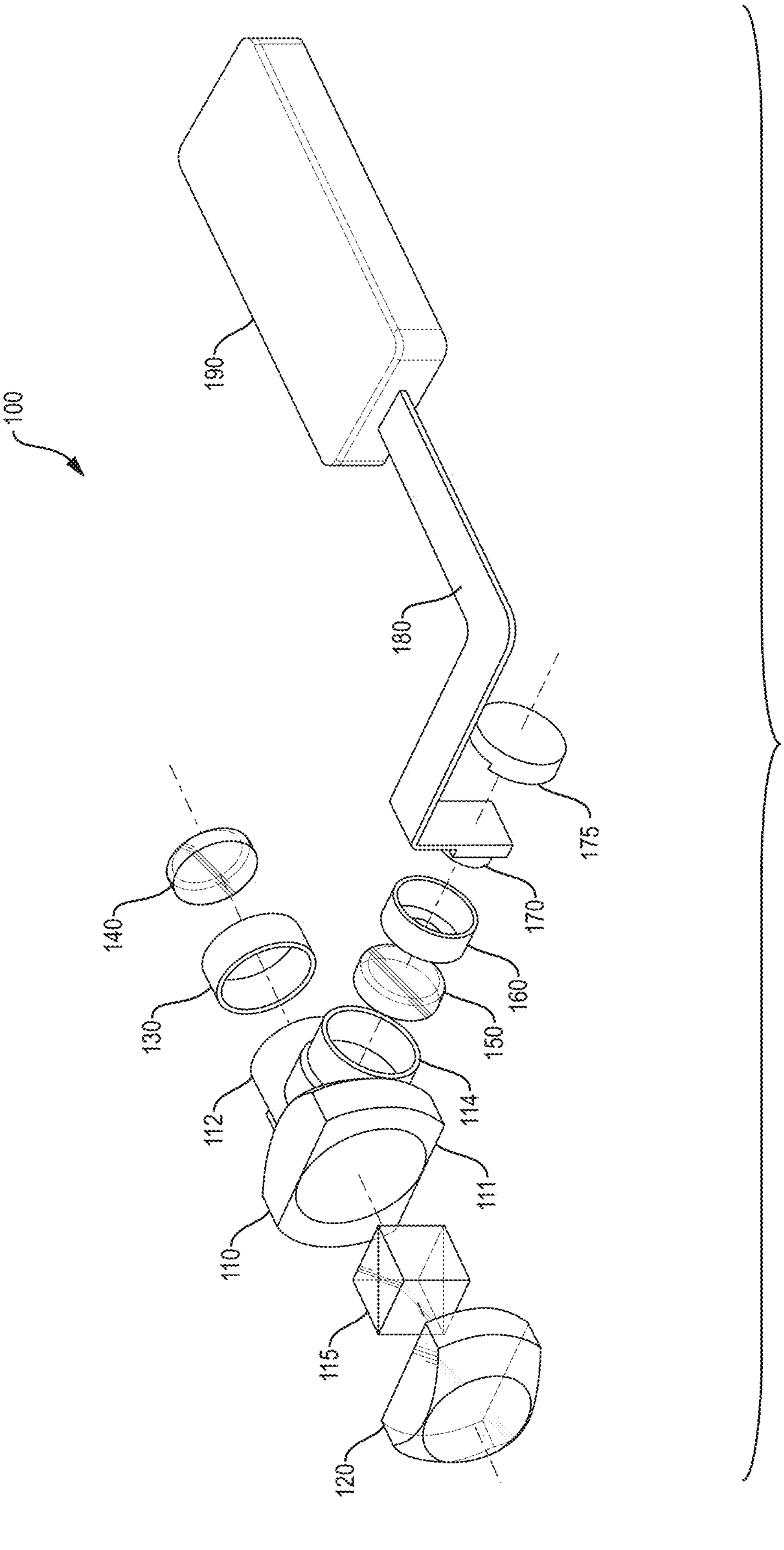
FIG. 2 illustrates a second exploded perspective view of the first exemplary embodiment shown in FIG. 1

FIG. 2 illustrates a second exploded perspective view of the first exemplary embodiment shown in FIG. 1. In second perspective view of magnification/image capture device 100 is shown, beam splitter 115 within housing 110 and objective lens 120 positioned at a distal end 111 of housing 110. Further illustrated is eye-lens 140 positioned within a proximal end 112 of housing 110 and extension 114 positioned between proximal end 111 and distal end 112 into which is inserted second eye-lens 150 and image capture device 170. In accordance with the principles of the invention, the positioning of housing extension 114 with respect to housing 110 would be understood by those skilled in the art to be based on maintaining a substantially equal distance between objective lens 120 and eye-lens 140 and objective lens 120 and second eye-lens 150 to allow for a substantially same level of magnification.

Further illustrated are eye-lens housing 130 and second eye-lens housing 160 into which eye-lens 140 and second eye-lens 150, respectively, may be incorporated. Eye-lens housing 130 and camera housing 160 may be slidable within corresponding ones of proximal end 112 and housing extension 114 to render the distance between objective lens 120 and eye-lens 140 substantially the same as the distance between objective lens 120 and second eye-lens 150. Eye-lens housing 130 and camera eye-lens housing 160 may be collimated and glued in place once the appropriate distances are established. In another aspect of the invention, proximal end 112 and housing extension 114 may include a screw thread into which corresponding eye-lens housing 130 and camera housing 160, each with a corresponding screw thread, may be positioned within housing 110. Although a slidably arrangement or a screw thread configuration is discussed, it would be recognized that other types of connections (e.g., a bayonet connection) may be incorporated into housing 110 without altering the scope of the invention.

Figure 3:
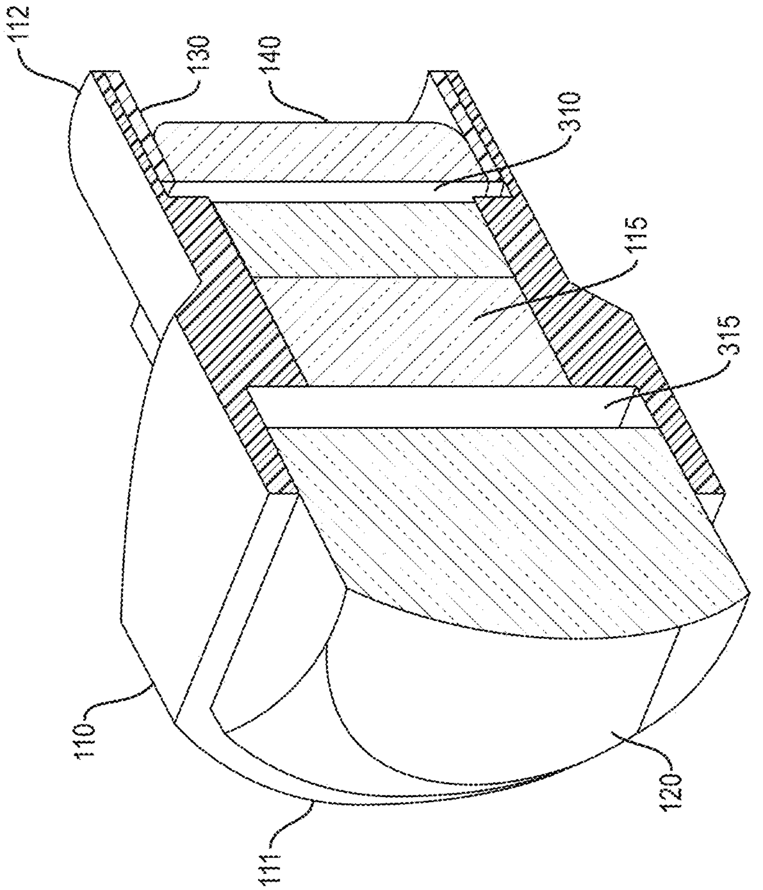
FIG. 3 illustrates a perspective cut-away side view of the telescopic/image capture device shown in FIG. 1.

FIG. 3 illustrates a perspective cutaway view of an assembled telescope/image capture device 100 shown in FIG. 1.

In this illustrated view, objective lens 120 is positioned within housing 110 and spaced apart from beam splitter 115 by spacer 315. Spacer 315 may comprise an optically clear material of a desired thickness that allows beam splitter 115 to be appropriately positioned within housing 110. Further illustrated is spacer 310, which similar to spacer 315 is of an optically clear material of a desired thickness to separate eye-lens 140 an appropriate distance from beam splitter 115. Spaces 310 and 315 and light director 115 create a distance between objective lens 120 and eye-lens 140 that determine the magnification level of device 100.

Although spacers 310 and 315 are discussed with regard to optically clear material, it would be recognized that spacers 310 and 315 may also be air gaps between the elements. In one aspect of the invention, the positioning of objective lens 130, beam splitter 115 and eye-lens 140 may be achieved by ridges along an inner surface within housing 110 that limits the movement of the contained elements therein. Thus, spacers 310 and 315 are created by the fixed placement of the referred to elements.

Further illustrated, in further detail, eye-lens housing 130, including eye-lens 140, positioned within distal end of housing 110. In this illustrated example, eye-lens housing 130 comprises a slidable engagement with respect to housing 110 and may be held in place with an adhesive material.

Figure 4:
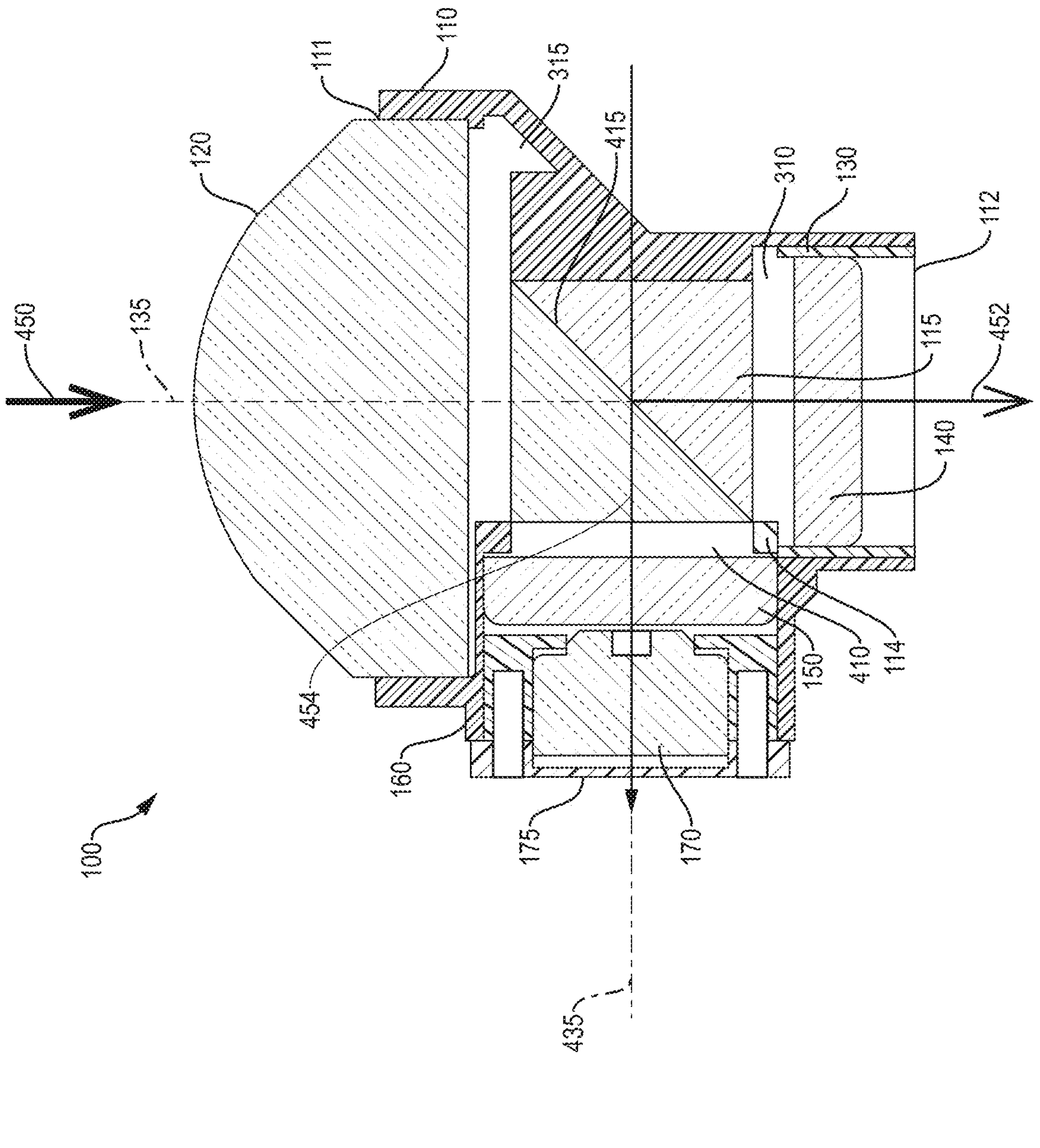
FIG. 4 illustrates a cut-away top view of the telescopic/image capture device shown in FIG. 1.

FIG. 4 illustrates a cutaway top view of an assembled telescope/image capture device 100 shown in FIG. 1.

In this illustrated view first optical axis 135 is shown extending along a longitudinal axis of telescope/image capture device 100 through objective lens 120 and eye lens 140. The separation between objective lens 120 and eye lens 140, in part, defining the magnification level of telescope/image capture device 100. Further illustrated, is second optical axis 435 extending through image capture device 170 substantially tially perpendicular to first optical axis 135, wherein spacer 410 positions second eye-lens 150 a known distance from beam splitter 115 so as to provide appropriate separation to enable the distance between objective lens 120 and second eye-lens 150 to be substantially the same as the distance between objective lens 120 and eye-lens 140. First optical axis 135 and second optical axis 435 intersect along (partially) reflective surface 415 associated with beam splitter 115. In accordance with the principles of the invention, light 450 associated with an image entering objective lens 120 impinges upon partially reflective surface 415 of beam splitter 115, wherein a known portion of light 452 of the input light 450 continues through reflective surface 415 toward eye-lens 140 where the image, which has been enlarged by the positioning of objective lens 120 and eye lens 140, may be viewed by a user (not shown). The remaining portion of light 454 of the input light 450, which is reflected by reflective surface 415, is directed toward second eye-lens 150, where an image (or a video), which has been magnified by the positioning of objective lens 120 and second eye-lens 150, is captured by image capture device 170.

In one aspect of the invention, the partially reflective surface 415 may allow for an equal distribution (50-50) of light impinging upon its surface. In another aspect of the invention, the distribution of light may allow for more light to pass through to be viewed and less light to be captured by image capture device 170. For example, reflective surface 415 may possess a transmission/reflective property of a 70/30 light distribution wherein seventy (70%) percent of the light associated with a viewed image impinging upon reflective surface 415 is passed through reflective surface 415 to be viewed by a user, while thirty (30%) percent of the light is reflected by reflective surface 415 toward image capture device 170. Other combinations of light distribution (80/20, 60/40, etc.) may similarly be incorporated into the transmission/reflective properties without altering the scope of the invention. In still a further aspect of the invention, 90 percent of the light entering objective lens 120 may pass through to eye-lens 140 while the remaining 10 percent of the light is directed by surface 415 toward second eye-lens 150. In this illustrated example, a 75/25 split is shown by the dimensions of the light rays 450, 452 and 454.

Figure 5:
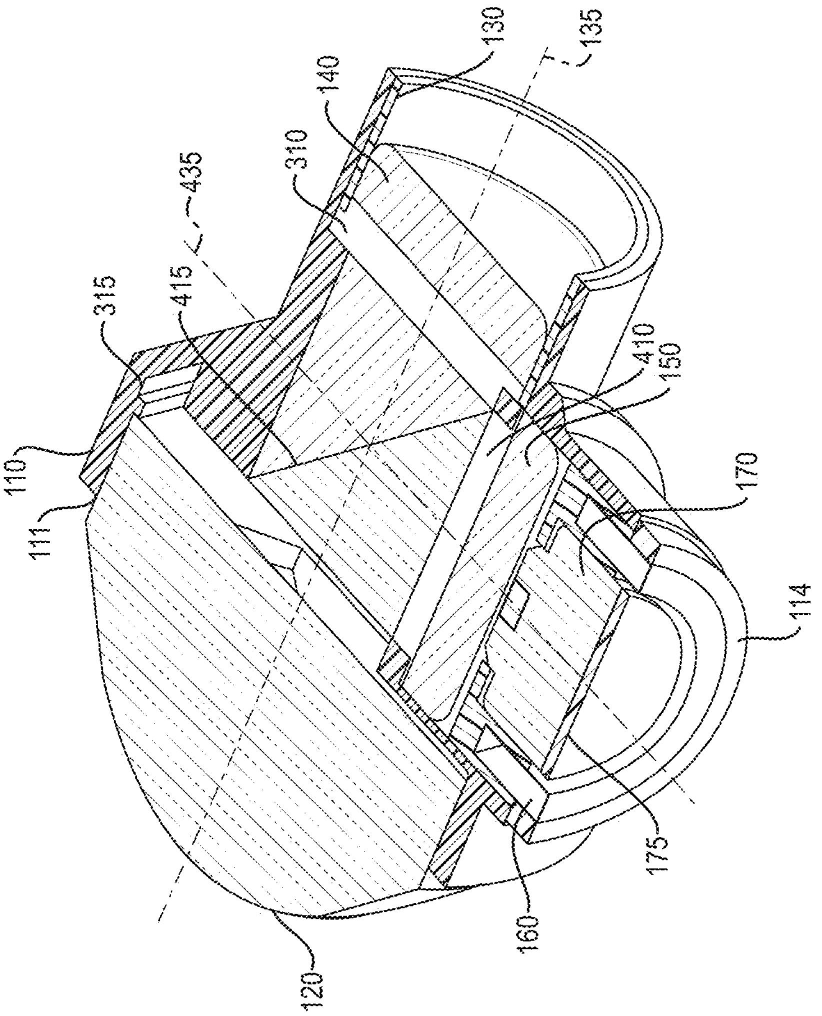
FIG. 5 illustrates a perspective view of the cut-away to view shown herein.

FIG. 5 illustrates a prospective cut-away top view of the telescopic/image capture device 100 disclosed, herein.

In this exemplary prospective top view of device 100, it is more clearly shown eye-lens 140 and lens housing 130 positioned within a distal end 112 of housing 110. Further illustrated is camera housing 160 and second eye-lens 150 and image capture device 170 positioned within housing extension 114, wherein a straight-line distance along axis 135 between objective lens 120 and eye-lens 140 is substantially the same as the distance between objective lens 120 and second eye-lens 150, when the distance the light reflected off of reflective surface 415 and along axis 435 is considered.

Figure 6:
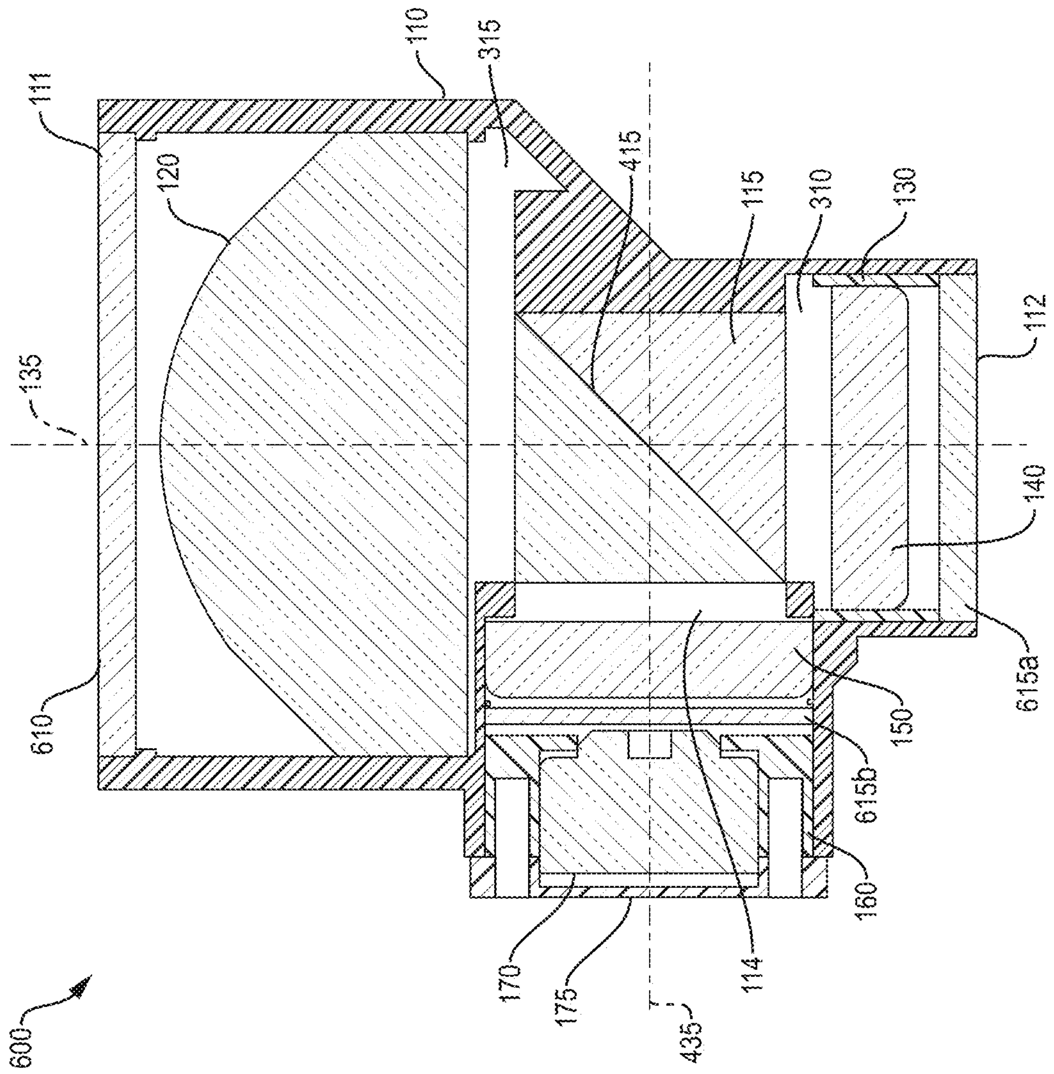
FIG. 6 illustrates a cut-away top view of a second aspect of the first exemplary embodiment of a telescopic/image capture device in accordance with the principles of the invention.

FIG. 6 illustrates a cut-away top view of a second aspect of the first exemplary embodiment Shown in FIG. 1.

In this illustrated second aspect, which is similar to the configuration shown in FIG. 4, telescopic/image capture device 600 comprises objective lens 120 contained within distal end 111 of housing 110 and eye-lens 140 positioned within eye-lens housing 130 within proximal end 112. Further illustrated is second eye-lens 150 and image capture device 170 positioned within housing 160 which is positioned in housing extension 114.

In accordance with the second exemplary embodiment of a magnification device further illustrated is objective filter 610 positioned toward distal end 111 of housing 110, wherein filter 610 includes optical characteristics (e.g., optical density) to reduce or attenuate undesired light wavelengths while allowing passage of desired wavelengths. For example, filter 610 may include optical characteristics that may reduce in magnitude or intensity (through absorption or reflection) light associated with a viewed image in a first wavelength range while allowing light associated with the viewed image within a second wavelength range to pass substantially unattenuated. For example, filter 610 may be configured to reduce light wavelengths associated with a viewed image or area in a first wavelength range by 80 percent and allowing 20 percent of the light within the first wavelength (i.e., residual light) and 100 percent of light within a second wavelength range to pass (i.e., unattenuated light).

Accordingly, attenuated light in the first wavelength range and the unattenuated light in the second wavelength range is then magnified based on the magnification level of combination of objective lens 120 and eye-lens 140 (or second eye-lens 150).

To reduce the residual light within the first wavelength range remaining after attenuation by filter 610, eye-lens filter 615*a* and second eye-lens filter 615*b* are introduced within the optical paths along optical axis 135 and 435, respectively. Eye-lens filter 615*a* and second eye-lens filter 615*b* each possess optical properties that reduce the intensity of the magnified residual light in the first wavelength range to a second residual magnitude while allowing light, associated with the viewed image within the second wavelength range to pass substantially unattended.

In one aspect of the invention, the optical characteristics (whether absorptive or reflective) of objective filter 610 may be determined based at least on an expected magnitude or intensity of light within a first wavelength range so as to reduce the intensity of the incoming light to a known residual magnitude and the optical characteristics (whether absorptive or reflective) of each of eye-lens filter 615*a* and image capture device filter 615*b* may be based at least on the optical characteristics of the objective filter 610, the known level of magnification of the combination of objective lens 120 and eye-lens 140, and the percent of light distribution of beam splitter 115, wherein the intensity of the magnified residual light is reduced to a second residual magnitude. In one aspect, the second residual magnitude may be selected to be below a level that may cause damage to the eyes of a user viewing the image. U.S. Pat. Nos. 10,895,735 and 11,099,376, the content of both of which are incorporated by reference, herein, provides more detailed teaching regarding the selection of the optical characteristics of objective filter 610 and eye-lens filter 615*a* (and/or filter 615*b*) to reduce the intensity of an incoming light within a known wavelength band while allowing the incoming light to be substantially unattenuated in a second wavelength band. For example, U.S. Pat. No. 10,895,735 teaches the selection of optical characteristics of objective lens filters and eye-lens filters to reduce wavelength that may be harmful to a user's eyes to acceptable limits (i.e., below a c threshold) before being viewed by a human eye. U.S. Pat. No. 11,099,376 teaches the selection of optical characteristics of objective lens filters and eye-lens filters 615*a*, to reduce light within undesired wavelength ranges, while allowing light in desired wavelength to pass when light of multiple wavelengths bands are emitted and may impinge on objective filter 610.

In one aspect of the invention, the optical characteristics of eye-lens filter 615*a* and second eye-lens filter 615*b* may be selected to be the same or selected to be different. In one aspect of the invention, the optical characteristics of filters 615*a* and 615*b* may be different based at least in part on the characteristics of beam splitter 115, as the amount of light reaching filter 615*b* may be substantially less than the amount of light reaching filter 615*a*. Thus, while the optical characteristics of eye-lens filter 615*a* may be selected to reduce the magnitude of an incoming light, as reduced by the characteristics of light director 115, in a first (or undesired) wavelength range to a level that prevents the light in the wavelength range from being harmful to, or unnecessary for viewing by, a user, the optical characteristics of filter 615*b* may further be determined based on the sensitivity of the image capture device 170. Thus, the optical characteristics of filter 615*b* may be significantly different than those of filter 615*a* based on the reduced intensity of light entering filter 615*b* as a result of the beam splitting by beam splitter 115. In addition, there is a lack of need to reduce the magnitude of the light to a level that would be below a level that is harmful to a user's eye.

Figure 7:
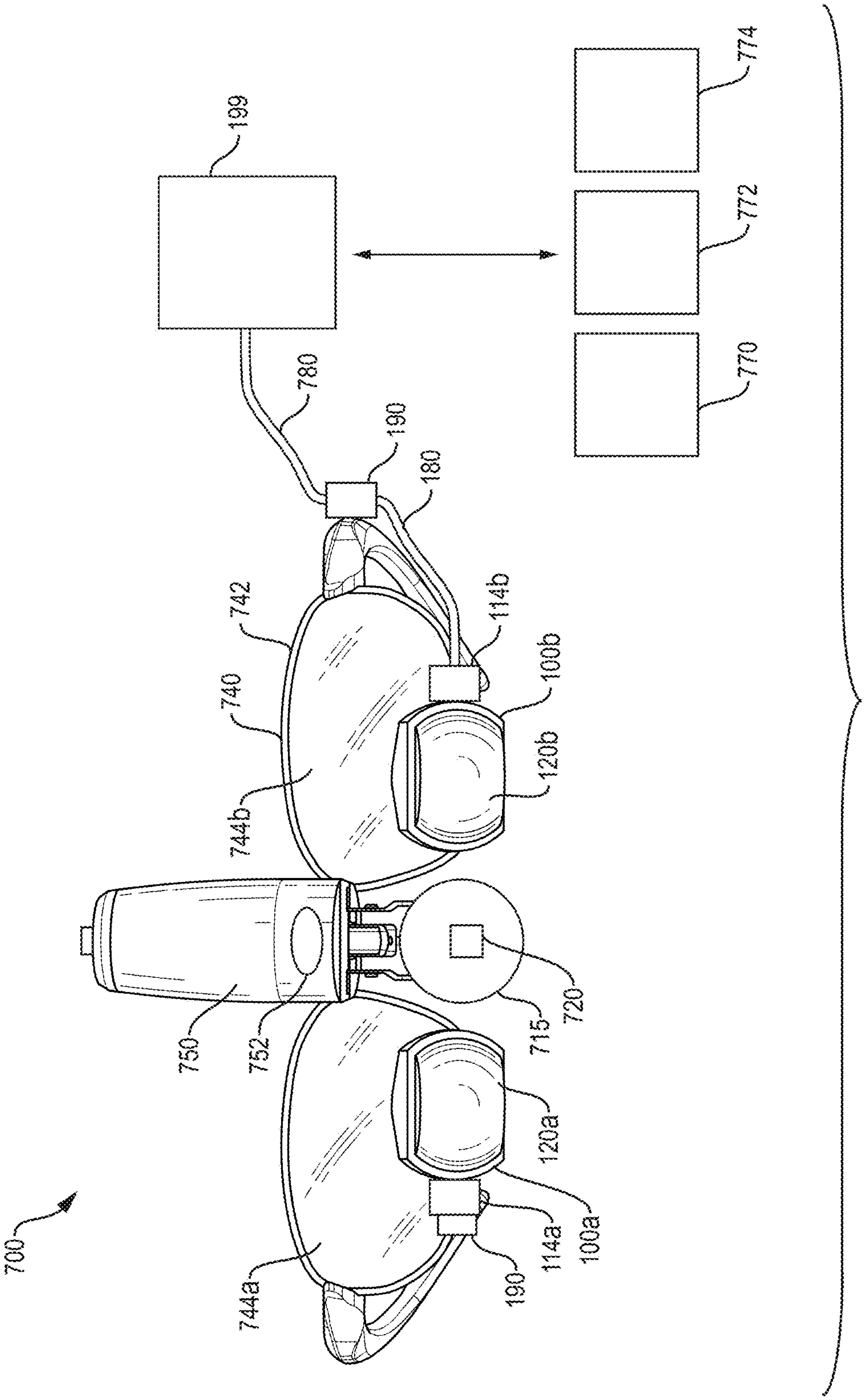
FIG. 7 illustrates an exemplary eyewear configuration incorporating the telescopic/image capture device discussed herein.

FIG. 7 illustrates an exemplary embodiment of a lighted eyewear configuration incorporating the telescopic/image capture device disclosed, herein. Lighted eyewear configuration 700 comprises an eyewear 740 includes frame element 742, which supports first lens 744*a* and second lens 744*b*.

Further illustrated is light assembly 715 including a lighting source 720 that may be used to light an area being viewed by a user. In accordance with one aspect of the invention, lighting source 720 may comprise a lighting source emitting light in a single wavelength band (e.g., white light, blue, red, violet, green, etc.) or emitting light in multiple wavelength bands, as discussed in U.S. Pat. No. 11,099,376. In addition, the light emitted by lighting source 720 may comprise light in wavelength bands that may be harmful to the eyes of a user and, thus, must be reduced in intensity (i.e., filtered) to prevent damage to the user's eyes. Alternatively, light emitted by lighting source 720 may interfere with the light desired to be viewed.

Power may be provided to light source 720 by a constant voltage supply; in this illustrated example, a battery (not shown) contained within pod 750. Control of the voltage provided to light source 720 may be obtained through switch 752 that may be one of a physical switch, a capacitive switch, a sensor switch or a remote switch. A physical switch may be a conventional two (2) position (on/off) switch that requires a user to physically touch the switch. A capacitive switch may comprise an electronic circuit that detects a change in capacitance when a designated region is touched or a change in an electrostatic field when an object passes nearby. A sensor switch, which may be active or passive, may, for example, detect the presence of a reflection of a transmitted signal and a remote switch may be a switch that transmits a signal to a receiver on an electric circuit that controls the application of a voltage to the lighting source.

In addition, although a battery configuration is illustrated and discussed it would be recognized that other forms of constant energy may be provided to lighting source 720. For example, a wired connection from the electronic components associated with the image capture device (not shown) within extension housing 114 within the illustrated eyewear to a remote power source (not shown), which may be one of: a battery source or an AC/DC converter may be incorporated to the eyewear 700 without undue experimentation. In one aspect of the invention, the wired connection may be removably attachable to extension housing 114. Although lighting source 720 is shown attached to eyewear 740, it would be recognized that lighting source 720 may be a separate from eyewear 740 and it would be within the knowledge of those skilled in the art of utilizing a separate lighting source.

In the exemplary configuration shown, telescope/image capture devices 100 is incorporated into lens 744*a* into lens 744*b*. Although a two telescopic/image capture devices are shown, it would be understood that a single telescopic/image capture device 100 may be utilized in the eyewear 740, without altering the scope of the invention.

In this illustrative exemplary embodiment of the use of device 100, a first telescopic/image capture device 100, referred to as device 110*a*, is shown incorporated into lens 744*a* wherein device 110*a* includes transmitter 190 directly attached to extension housing 114*a*. Transmitter 190 transmits the collected photographic/video data from an image capture device within extension housing 114 (referred to as 114*a*) to receiving system 199, as discussed with regard to FIG. 1.

Receiving system 199, after receiving the photographic/video image data provides the received data to one of a display system 770, a storage system 772 and a processing system 774, which may process the received data and provide a processed image to display system 770. Although receiving system 199 is shown separated from display system 770, storage system 772 and processing system 774, it would be recognized that receiving system 199 may be incorporated into display system 770, storage system 772 and processing system 774 without alternating the scope of the invention claimed.

Further illustrated is a second telescopic/image capture device 100, referred to as 100*b*, incorporated into lens 744*b*. In this exemplary configuration, image capture device (not shown) within extension housing 114 (referred to as 114*b*), transfers collected photographic images/video data to transmitter 190, through a wired connection 180 as is shown in FIG. 1. In this illustrated example, transmitter 190 is shown placed on frame 740. However, it would be understood that transmitter 190 may be located in any position (e.g., a belt, a shirt collar, etc.) that may be reached by a length of wired connection 180 shown. Transmitter 190, as previously discussed, transmits the received data to receiving system 199. In this illustrated example, the transmission of image data is through wire-ed connection 780 between transmitter 190 and receiving system 199.

Although a wireless and a wire-ed configuration are shown with regard to the means for transmitting collected photographic/video image data to transmitter 190 and a wireless and a wire-ed configuration to transmit photographic/video image data to receiving system 199, it would be recognized that both methods of data transfer (wired, wireless) are considered within the scope of the invention and either method may be employed without altering the scope of the invention.

Accordingly, images may be viewed and currently collected by magnification device 100*a* and 100*b* in real-time while performing a procedure (e.g., dental surgery), wherein the images are magnified by a level comparable to those that are view. The captured images are provided to transmitter 190 to be transmitted to a receiving system 199, which provides for a viewing/collection medium (e.g., a computer, a display, a cell phone, etc.). The collected images (e.g., video and photos) may then be subsequently reviewed and analyzed to insure proper treatment and/or training.

Figure 8:
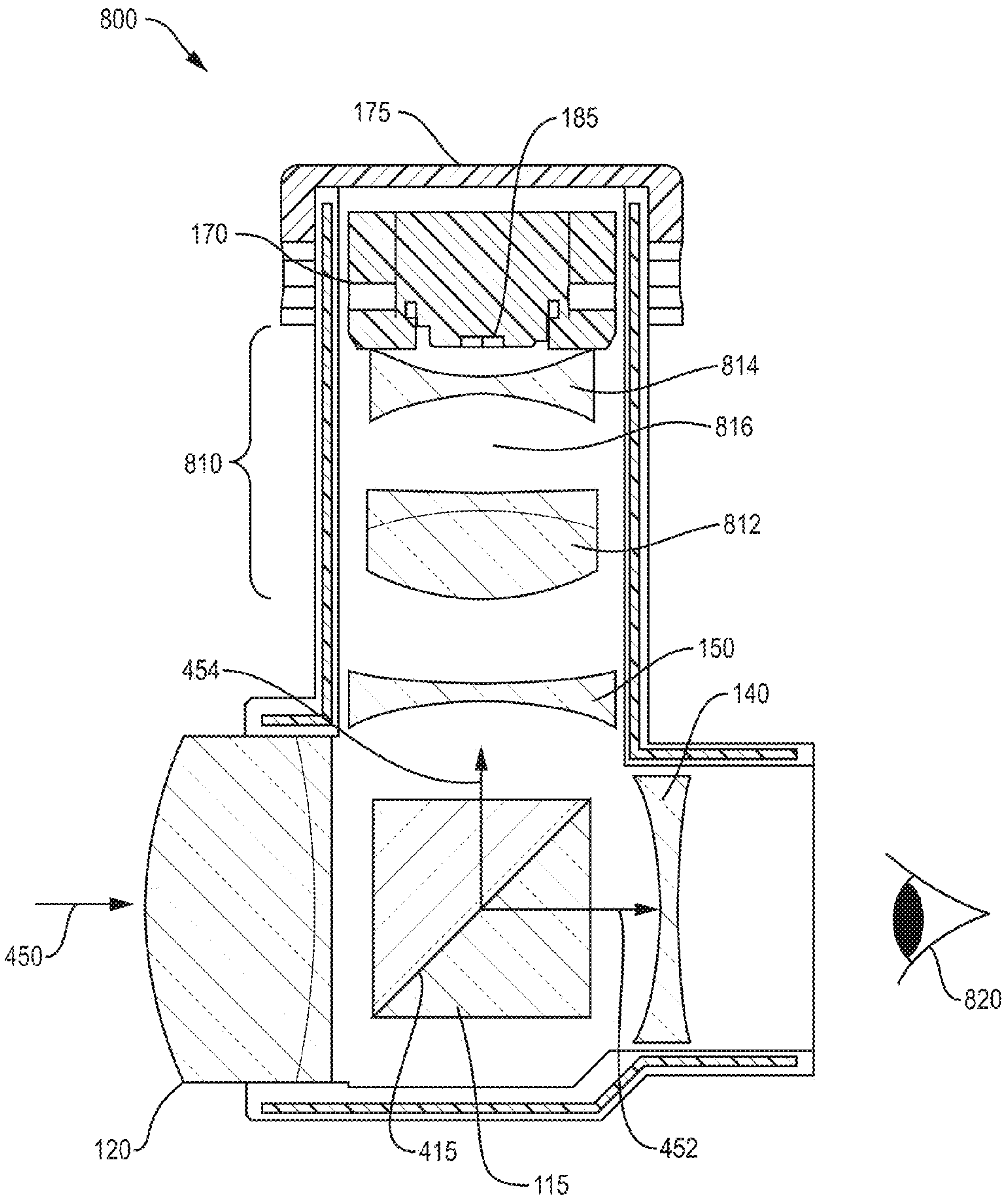
FIG. 8 illustrates a cross-sectional view of a first aspect of a second exemplary embodiment of a telescopic/image capture device in accordance with the principles of the invention.

FIG. 8 illustrates a cross-sectional view of a first aspect of a second exemplary embodiment of a telescopic/image capture device in accordance with the principles of the invention.

In this illustrated embodiment, telescopic/image capture device 800 comprises objective lens 120, splitter 115, eye lens 140 and second eye lens 150, as previously described. Further illustrated is image capture device 170 including lens 185.

In accordance with this second aspect of the invention claimed is "afocal" telescope 810 (i.e., focused at infinity) inserted between second eye lens 150 and lens 185. Afocal telescope 810 comprises a second objective lens 812 and a third eye-lens 814 separated by spacer 816. I this illustrated second embodiment, afocal telescope 810 represents a second magnification device that further magnifies the image to be captured by image capture device 170. For example, with a 2.5× (2.5 times) magnification level achieved by the optical characteristics of objective lens 120 and eye-lens 140 and the spacing therebetween, and a similar level of magnification (2.5×) between objective lens 120 and second eye-lens 150, afocal telescope 810 provides a further level of magnification of the viewed image. For example, a 2 times (2×). Accordingly, images viewed by device 170 provides for a five times (5×) magnification of the collected image.

Figure 9:
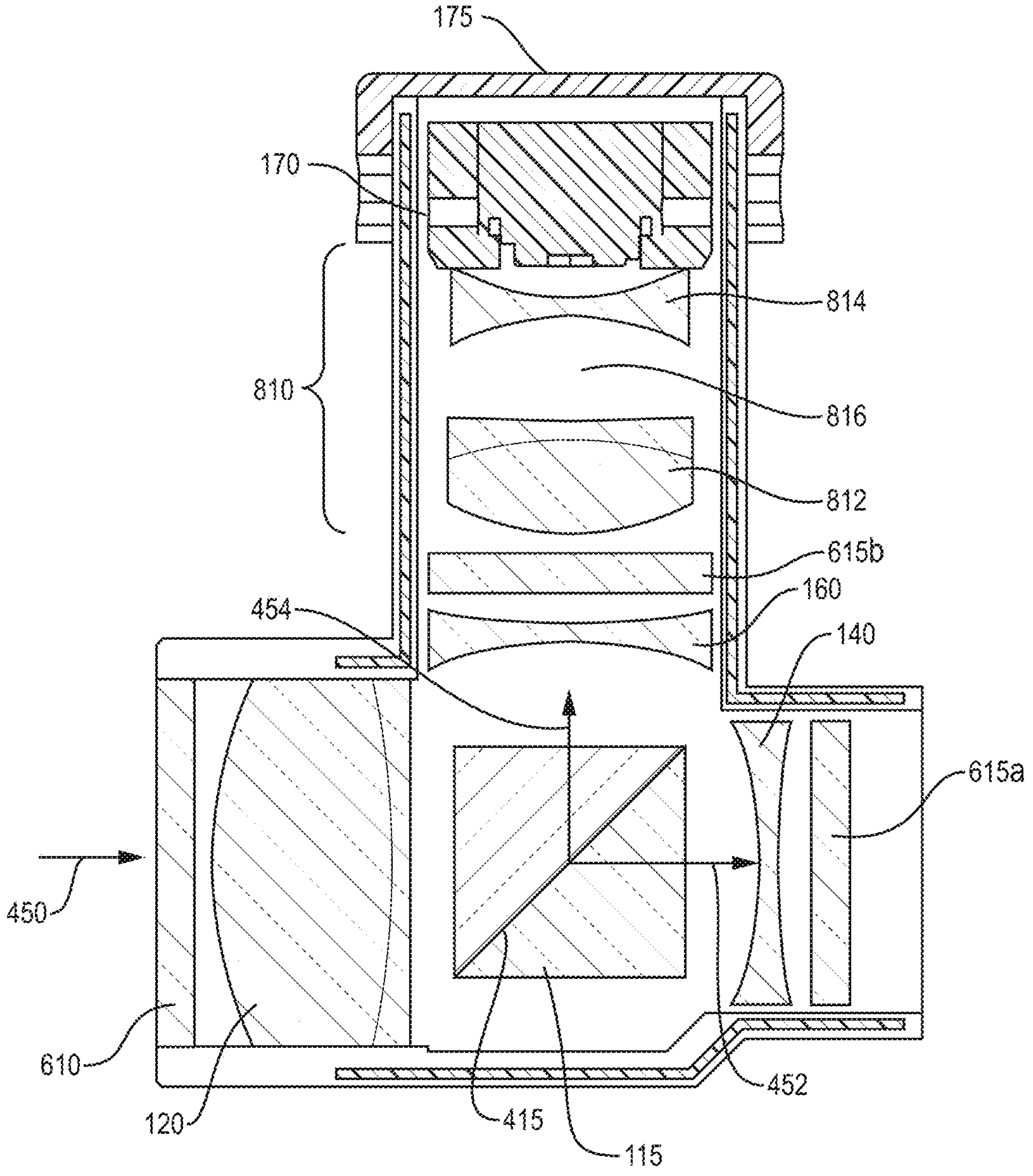
FIG. 9 illustrates a cross-sectional view of a second aspect of a second exemplary embodiment of a telescopic/image capture device in accordance with the principles of the invention.

FIG. 9 illustrates a cross-sectional view of a second aspect of the second exemplary embodiment of a telescopic/image capture system shown in FIG. 8.

In this illustrated aspect of the invention 900, filters 610, 615*a* and 615*b*, which were previously discussed, are incorporated into device 800 shown in FIG. 8. Operation of the magnification device 900 is comparable to that of FIG. 8 with the additional feature of selecting filtering characteristics that limit the wavelength range viewed by user 820 and image capture device 170, as discussed with regard to FIG. 6.

Figure 10:
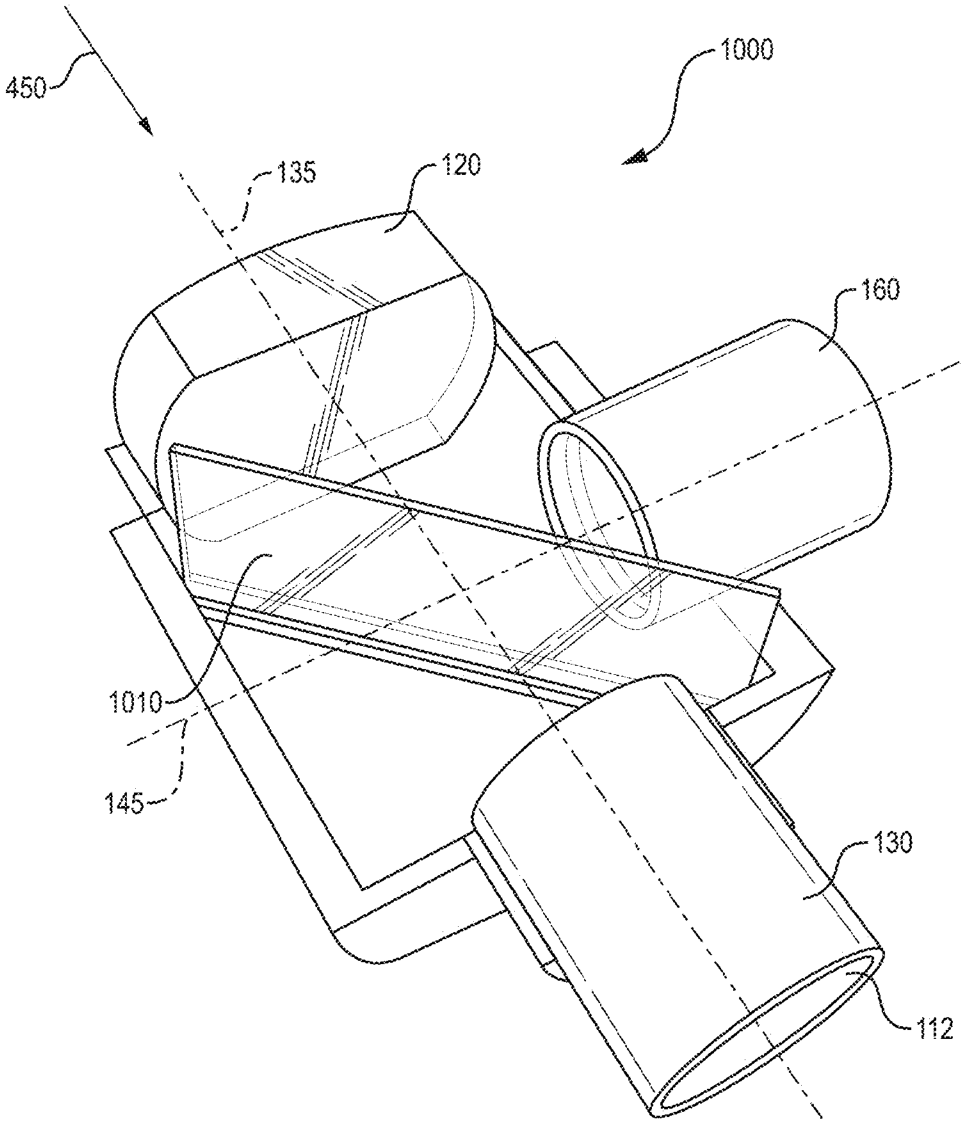
FIG. 10 illustrates a cut-away prospective view a first aspect of a third exemplary embodiment in accordance with the principles of the invention.

FIG. 10 illustrates a cutaway perspective view of a third exemplary embodiment of a telescopic/image capture device 1000 in accordance with the principles of the invention.

In this exemplary embodiment, which comprises an eyelens housing and a camera housing similar to that shown in FIGS. 1-9, as previously discussed.

Further illustrated is plate beam splitter 1010, which operates in a manner similar to beam splitter 115, to direct light 450 entering objective lens 120 along optical axis 135 to eye-lens housing 130 and along optical axis 145 toward camera housing 160, wherein optical axis 135 and camera axis 145 being substantially perpendicular.

Plate beam splitter 1010, similar to beam splitter 115, includes a partial reflective/partial transmissive surface that allows for the partial transmission of the incoming light toward camera housing 160 and eye-lens 130, respectively. As would be recognized, the percentage of light reflected and transmitted by plate beam splitter 1010 is determined, in part based on the coating of applied to a surface of splitter 1010.

Figure 11:
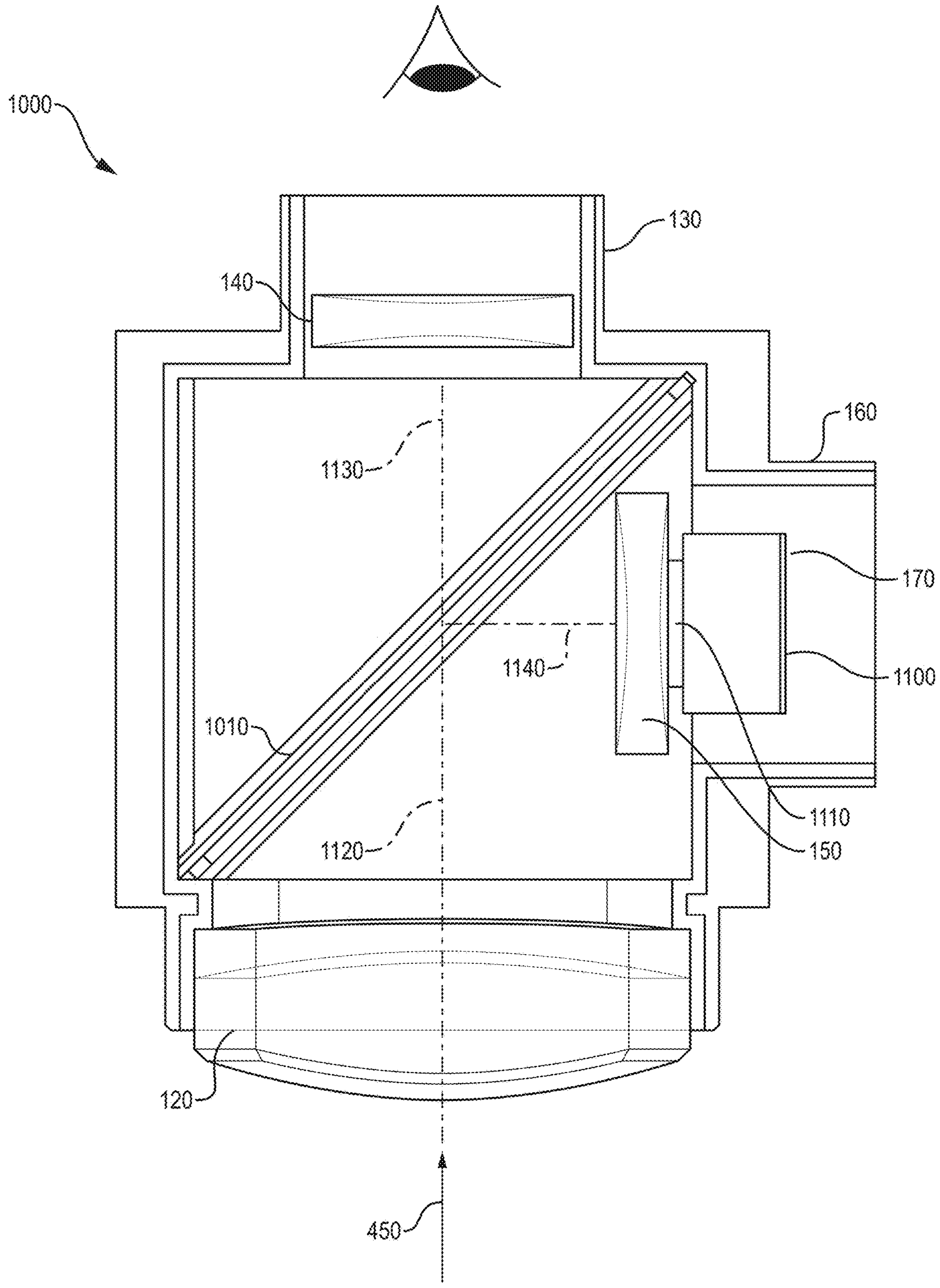
FIG. 11 illustrates a top view of the third exemplary embodiment of the invention.

FIG. 11 illustrates a top view of the third exemplary embodiment of a telecam device in accordance with the principles of the invention.

As shown, device 1000 includes objective lens 120, plate splitter 1010, eye-lens 140 and second eye-lens 150, as previously described.

Further illustrated are image capture elements, comprising image capture device 170, which generally includes a CCD (not shown) and lens system. In this illustrated example, Image capture 170 is shown as separate elements of a CCD device 1100 and lens system 1110. In one aspect of the invention lens system 1110 may be separate from CCD 1100 (as shown). Alternatively, lens system 1110 may be integrated with CCD 00 wherein integrated lens system 1110 and CCD 1110 are, herein, referred to as a digital camera.

Lens system 1110 focuses light reflected from splitter 1010 onto the sensor elements (not shown) associated with CCD 1100 such that the images associated with light 450 reflected by splitter 1010 are in focus.

Further illustrated are distance measurements 1120, 1130 and 1140, wherein distance 1120 represents a distance travelled by light 450 between objective lens 120 and splitter 1010. Distance 1130 represents a distance, travelled by light 450 transmitted through splitter 1010, between splitter 1010 and eye-lens 140. Similarly, distance 1140 represents a distance travelled by light 450 reflected from splitter 1010, between splitter 1010 and second eye-lens 150.

As has been discussed previously, a first telescopic system is formed by the combination of objective lens 120 and eye-lens 140, based at least on a total distance (i.e., 1120+1130), traveled by light 450 between objective lens 120 and eye-lens 140 and a second telescopic system is formed by the combination of objective lens 120 and second eye-lens 150 based, at least on a total distance (i.e., 1120+1140) between objective lens 120 and second eye-lens 150. In one aspect of the invention, by setting distance 1140 to be less than distance 1130, the magnification level achieved by the first magnification device is different than a magnification level achieved by the second magnification device.

However, the smaller distance of 1140 enables second eye-lens to be positioned closer to splitter 1010, which, comparable to an optical condition, referred to in the art as "window effect," a field of view captured by image capture device 170 through the second magnification device is greater than a field of view associated with the first magnification device.

Figure 12A:
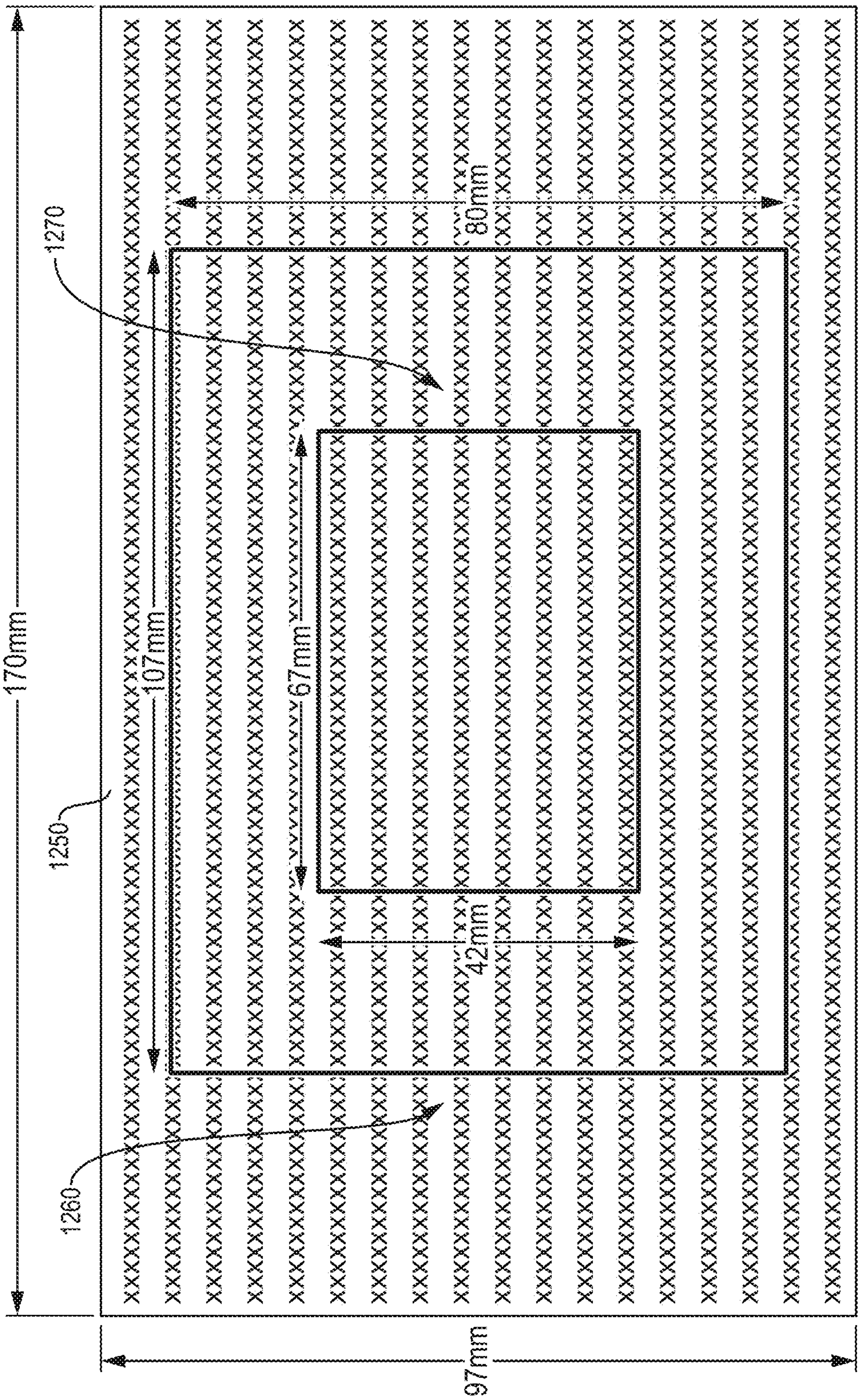
FIGS. 12A-12C illustrate exemplary views of images viewed through the embodiment of the invention shown in FIGS. 10 and 11.
Figure 12B:
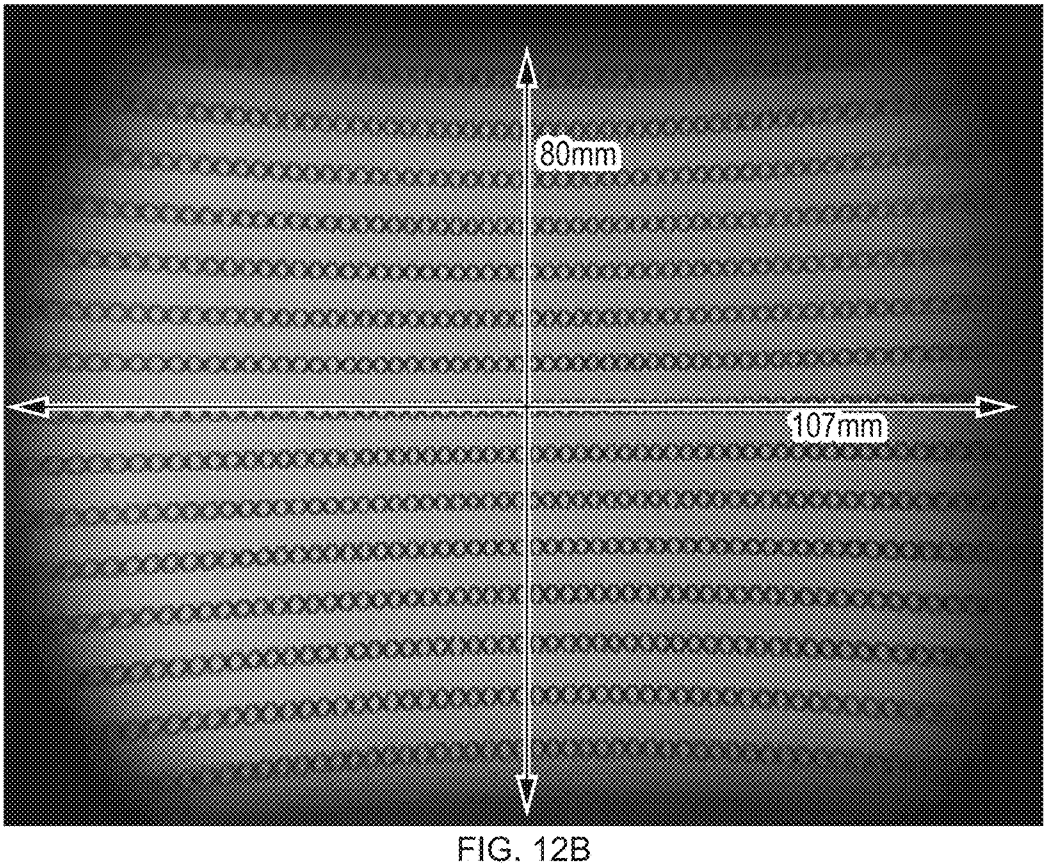
Figure 12C:
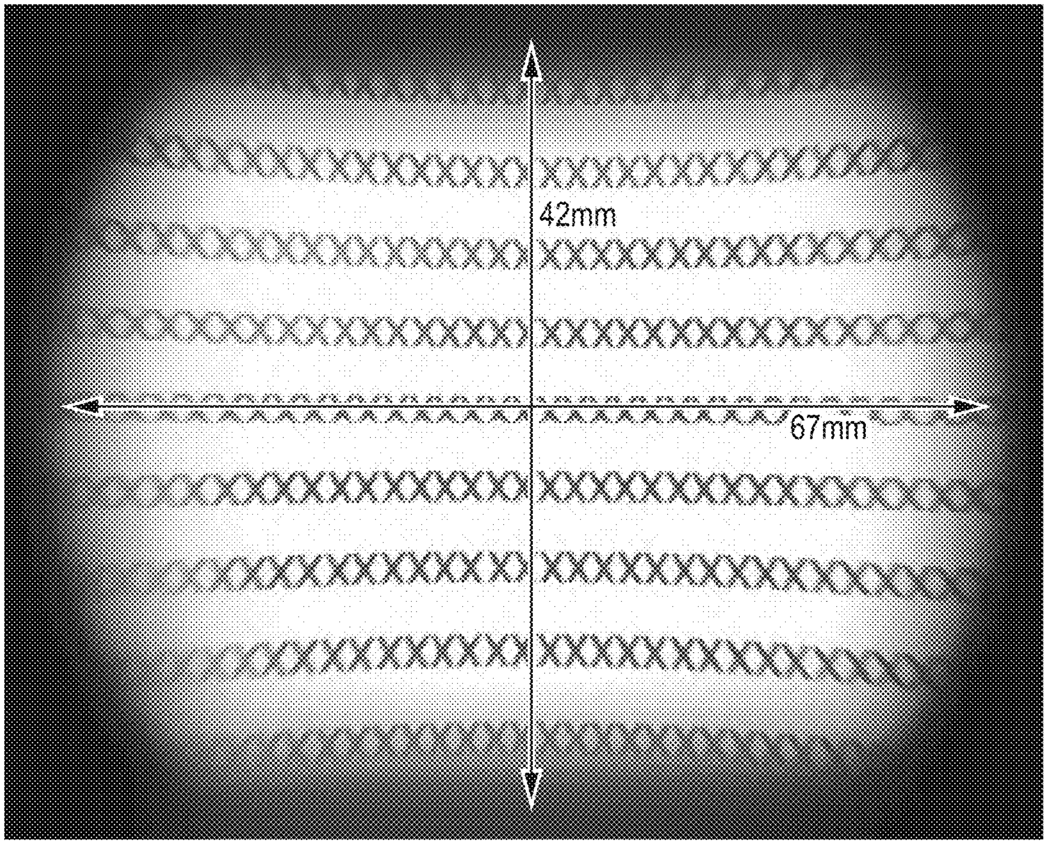

FIGS. 12A-C illustrates exemplary views of a pattern viewable through an exemplary telescopic/image capture device in accordance with the principles of the invention.

FIG. 12A illustrates a representative pattern, consisting of a plurality of "X's" arranged in rows and columns, in a plane centered about a common point a known distance from, and viewable through, the devices shown herein.

FIG. 12A illustrates area 1250, measuring 170 mm (millimeters) by 97 mm, which represents an the area of the representative pattern to be viewed by the illustrated telescopic/image capture devices shown, herein Further illustrated, within FIG. 12A, is area 1260. Area 1260 represents the area within area 1250 that is viewable and captured by image capture device 150 associated with the telescopic/image capture devices. As area 1250 is viewed through the magnification caused by light associated with area 1250 passing through objective lens 120 and second eye-lens 150, the area (i.e., FOV) associated with image capture device 170 (i.e., area 1260) is less than the original size of area 1250.

Further illustrated in FIG. 12A is area 1270, represents an area that is viewable by a user through the magnification caused by light associated with area 1250 passing through the magnification objective lens 120 and eye-lens 140. In this illustrated example of the viewable area associated with the telescopic/image capture devices shown, herein, the magnification caused by objective lens 120 and eye-lens 140 is set as 2.5×. In this case 2.5× magnification has been arbitrarily selected to show the principles of the invention. However, it would be recognized that different levels of magnification may be achieved by the telescopic/image capture devices, shown herein, without undue experimentation.

As shown, the area 1270 associated with viewing area 1250 through a 2.5× level of magnification is significantly smaller than area 1260, as the level of magnification associated with second magnification device (i.e., objective lens 120/second eye-lens 150) is less than the exemplary 2.5× discussed. This lower level of magnification being, in part, determined by the smaller distance of second lens 150 to beam splitter 1010, considering eye-lens 140 and second eye-lens 140 having substantially the same optical characteristics.

FIG. 12B illustrates an exemplary view of area 1250, shown in FIG. 12A, when viewed by image capture device 150 through the magnification caused by light passing though objective lens 120 and second eye-lens 150.

FIG. 12C illustrates an exemplary view of area 1250, shown in FIG. 12A, when viewed through first magnification device, comprising objective lens 120 and eye-lens 140. In this exemplary view of the representative pattern, the pattern is magnified by a known factor (i.e., 2.5×).

Although, the image shown in FIG. 12B is darker than the image shown in FIG. 12C, this darkest is due, in part, to the amount of light that is presented to image capture device 170 based on the transmissive/reflective properties of the splitter 1010. As image capture device is capable of capturing images with a significantly reduced amount of light (and any image captured may be digitally processed to improve brightness) the characteristics of splitter 1010 is selected in this exemplary example to be in a 90:10 transmissive/reflective relation.

A level of magnification associated with area 1260 may be determined, in part, considering the following:

Assume, (for the purposes of simplification) that the level of magnification is inversely proportional to the area;

then a ratio of the areas of the exemplary ratios shown may be utilized to determine a magnification factor.

For example,

Area 1260=8560 $mm^2$

Area 1270=2814 $mm^2$ $$\text{Magnification} = 2.5/(8560/2814) = 0.82x$$

Hence, the magnification level associated with the image captured by image capture device 150 is approximately 0.82×.

Although the exemplary configuration illustrates a magnification of 0.82, it would be understood that the magnification levels associated with the images captured by image capture device 170 may be altered by altering the distance between the splitter and the second eye-lens 150.

In addition, in the illustrated examples shown in FIGS. 12B and 12C, it would be recognized that the images 1260, 1270 of the representative pattern 1250 is in focus as the first magnification device (i.e., objective lens 120/eye-lens 140) is focused on the representative pattern, which is positioned a known working distance from objective lens 120. However, the altered dimension of the second magnification device (i.e., objective lens 120/second eye-lens 150) renders the image of the representative pattern out-of-focus since the working distance of the second magnification device is not the same as that of the first magnification device.

However, in accordance with the principles of the invention, lens system 1010 further comprises an auto-focusing system that may be utilized to render the viewed (or captured) image within area 1260 by image capture device 170 associated with the representative pattern in area 1270 to be in focus.

Accordingly, an optically magnified image of the representative pattern shown in area 1250, with a greater field of view may be achieved with the exemplary embodiment of a telescopic/image capture device (i.e., Telecam) in accordance with the principles of the invention.

In addition, in accordance with the principles of the invention, the optically magnified, greater field of view image, may be digitally enlarged such that the image (area 1260) viewed by second magnification device is substantially equal to the optical magnification achieved when area 1250 is viewed through first magnification device (i.e. objective lens 120/eye-lens 140). Hence, an image having a same level of magnification, but with a greater field of view may be presented to a user (i.e., a surgeon) on a display screen, as was previously discussed.

In addition, the optically magnified image associated with the first magnification device may be superimposed onto the digitally magnified image to present a magnified image with a greater field of view to a user. In another aspect of the invention, the digitally magnified and/or the superimposed images may be digitally enhanced to present the captured images in different color schemes, which may be used to determine different conditions within the increased field of view.

In summary, a telescopic/image capture device is disclosed that allows for the concurrent viewing and image capturing of an object, wherein the captured image may be magnified to same level as that of the viewed image. Furthermore, filters are incorporated into the device to allow for the attenuation of light in undesired wavelengths while allowing light in desired wavelengths to pass unattenuated. In still a further aspect of the invention, a second telescopic lens is incorporated into the path of light to be captured by the image capture device, wherein the image capture and recorded is of a greater magnification than that of the user viewable image.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above regarding specific embodiments. The benefits, advantages, and solutions to problems, and any element(s) that may cause any benefits, advantages, or solutions to occur or become more pronounced, are not to be construed as a critical, required, or an essential feature or element of any or all of the claim.

What is claimed is:

1. A magnification/recording device comprising:

a housing comprising:

a first magnification system comprising:

an objective lens positioned within a distal end of said housing; and an eye-lens positioned within a proximal end of said housing, said objective lens and said eye-lens being separated by a known distance, wherein said separation of said objective lens and said eye-lens achieving a known level of magnification of an object being viewed by said first magnification device along a first optical axis formed by said objective lens and said eye-lens;

a housing extension, extending perpendicular to said housing, said housing extension containing therein:

a second eye-lens, said objective lens and said second eye-lens forming a second magnification device along a second optical axis, said second optical axis being perpendicular to said first optical axis, wherein an optical distance between said objective lens and said second eye-lens is less than an optical distance between objective lens and said eye-lens; and an image capture device configured to:

capture an image of said object; and a light director, positioned, within said housing at an intersection of said first optical axis and said second optical axis, said light director, configured to:

transmit a known amount of light entering said objective lens toward said eye-lens along said first optical axis; and reflect a remainder of said light entering said objective lens toward said second eye-lens along said second optical axis, wherein a field of view of an image of said object captured by said image capture device is greater that than a field of view of an image of said object viewed by said first magnification device.

2. The magnification/recording device of claim 1, comprising:

an objective filter placed before said objective lens, said objective filter configured to:

attenuate said light entering said objective lens, in a first wavelength range to a reduced amplitude, wherein said light is attenuated prior to said light entering said objective lens; and allow passage of said light in a second wavelength range.

3. The magnification/recording device of claim 2, comprising;

an eye-lens filter placed after said eye-lens, wherein said eye-lens filter is configured to:

attenuate said reduced amplitude of light in said first wavelength range after said reduced amplitude of light in said first wavelength has been magnified by said known level of magnification, wherein an optical density of said eye-lens filter is based on an optical density of said objective filter and said known level of magnification; and a second eye-lens filter after said second eye-lens, wherein said second eye-lens filter is configured to:

attenuate said reduced amplitude of light in said first wavelength range after said reduced amplitude of light in said first wavelength has been magnified by said known level of magnification.

4. The magnification/recording device of claim 1, wherein said known amount of light is greater than said remainder light.

5. The magnification/recording device of claim 1 further comprising:

a transmitter configured to:

transfer images captured by said image capture device to a receiving system, wherein said transfer is through one of: a wired connection and a wireless connection.

6. The magnification/recording device of claim 3, wherein an optical density of said eye-lens filter is one of: a same as, and different than, an optical density of said second eye-lens filter.

7. The magnification/recording device of claim 1, wherein said image capture device comprises a camera, said camera comprising:

an auto-focus feature configured to:

render in focus images viewed by the image capture device.

8. The magnification/recording device of claim 1, wherein said image capture device comprises:

a lens; and at least one of: a charged coupled device (CCD) and a complementary metal-oxide semiconductor sensor (CMOS), wherein said lens comprises:

an auto-focus feature configured to:

focus images viewed by the image capture device.

9. The magnification/recording device of claim 1, wherein said light director is one of: a block beam splitter, a plate beam splitter and a partially transmissive and partially reflective mirror assembly.

10. The magnification/recording device of claim 1, wherein said first magnification device is focused at a known distance from said objective lens.

11. A viewing/recording device comprising:

an eyewear comprising:

a left lens;

a right lens; and a magnification/recording device incorporated into at least one of said left lens and said right lens, wherein said magnification/recording device comprises:

a first magnification device comprising an objective lens positioned at a distal end of said first magnification device; and an eye-lens positioned at a proximal end of said first magnification device, said objective lens and said eye-lens being separated by a known distance, wherein said separation of said objective lens and said eye-lens achieving a known level of magnification of an object being viewed by said first magnification device along a first optical axis formed by said objective lens and said eye-lens;

a second magnification device comprising:

a second eye-lens in conjunction with said objective lens, said second eye-lens forming a second optical axis perpendicular to said first optical axis, wherein an optical distance between said objective lens and said second eye-lens is less than an optical distance between objective lens and said eye-lens; and an image capture device; and a light director positioned at an intersection of said first optical axis and said second optical axis, said light director configured to:

transmit a known amount of light entering said objective lens toward said eye-lens; and reflect a remainder of said light entering said objective lens toward said second eye-lens.

12. The viewing/recording device of claim 11 comprising:

an objective lens filter placed before said objective lens, wherein said light entering said viewing/recording device enters said objective lens filter prior to entering said objective lens; and an eye-lens filter placed after said eye-lens, wherein said light passes through said eye-lens prior to entering said eye-lens filter; and a second eye-lens filter after said second eye-lens, wherein said remaining light passes through said second eye-lens prior to entering said second eye-lens filter.

13. The viewing/recording device of claim 11 comprising: an afocal magnification device in-line with said second magnification device along said second optical axis, said afocal magnification device configured to: magnify said remaining light after passing through said second magnification device.

14. The viewing/recording device of claim 11 comprising: a transmitter configured to: transfer images captured by said image capture device to a receiving system, wherein said transfer is through one of: a wired connection and a wireless connection.

15. The viewing/recording device of claim 11, wherein said light director is one of: a block beam splitter, a plate beam splitter and partially transmissive and partially reflective mirror assembly.

16. The viewing/recording device of claim 11 comprising: a lighting source configured to emit said light, wherein said lighting source is one of: attached to said eyewear and separate from said eyewear.

* * * * *